Jan. 29, 1929.
E. W. CAMPION ET AL
1,700,713
METHOD OF AND APPARATUS FOR TREATING MOLDING SAND
Filed Feb. 19, 1927
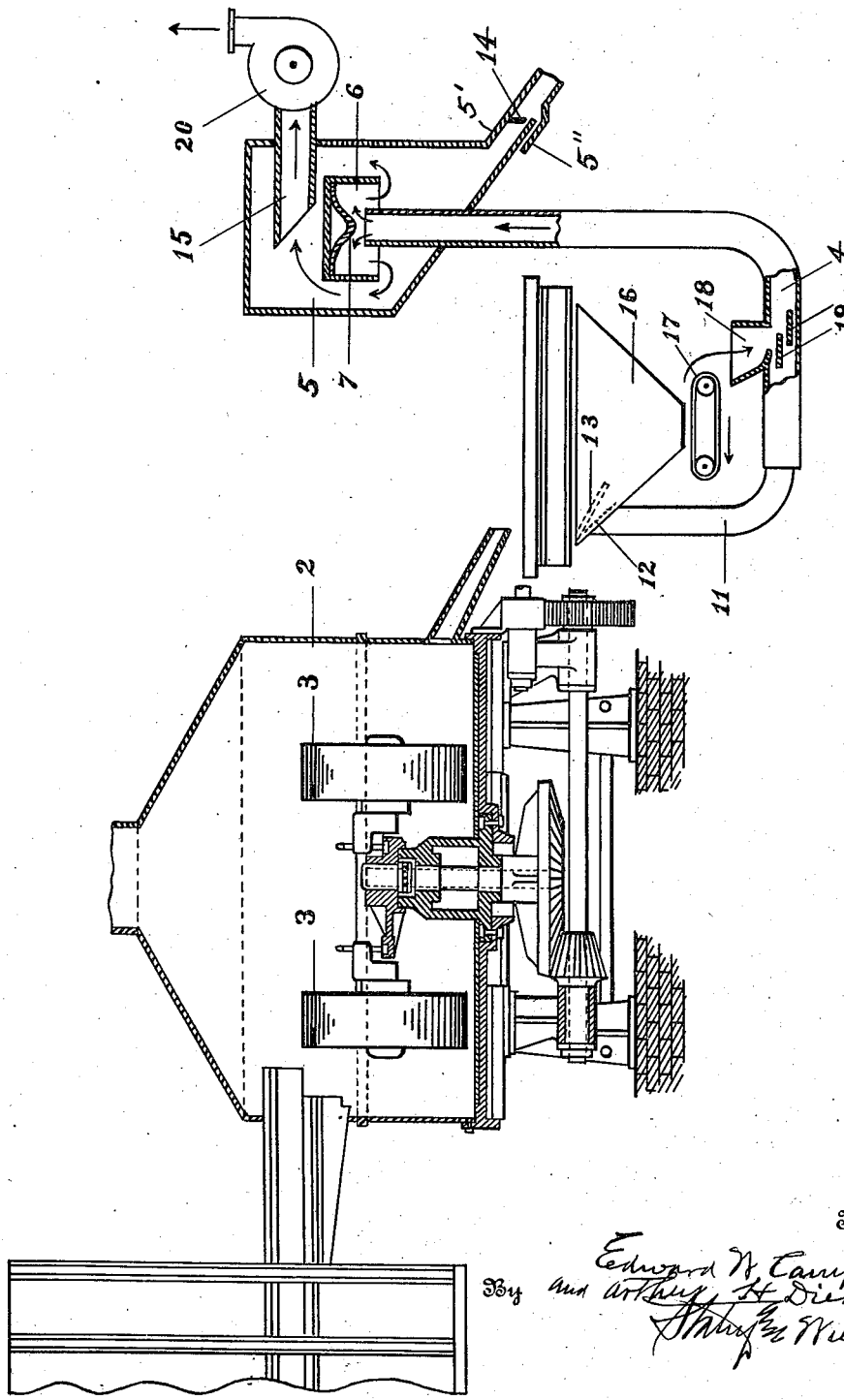
Inventors
Edward W. Campion
By and Arthur H. Dierker
[signature]
Attorneys Patented Jan. 29, 1929.

1,700,713

UNITED STATES PATENT OFFICE.

EDWARD W. CAMPION AND ARTHUR H. DIERKER, OF COLUMBUS, OHIO, ASSIGNORS TO THE BUCKEYE STEEL CASTINGS COMPANY, OF COLUMBUS, OHIO, A CORPORATION OF OHIO.

METHOD OF AND APPARATUS FOR TREATING MOLDING SAND.

Application filed February 19, 1927. Serial No. 169,622.

This invention relates to an improved method of and apparatus for treating molding sand, it relating more particularly to the treatment of used molding sand which has been rendered unfit for molding purposes due to certain physical and chemical changes which take place during the molding operation and the baking of the cores, although the invention also contemplates the treatment of certain grades of new sand, in which the bonding material is of an inferior grade, for the purpose of eliminating the bonding material to permit the freed sand grains to be mixed with a more suitable bonding substance.

In the art of molding, a sand mixture can be used but a limited number of times due to physical and chemical changes which take place, occasioned by the heat of the molten metal, and also by the baking of the cores. The sand mixture is composed of sand grains, usually quartz, and a bonding material for bonding the sand grains together so that they will retain the shape given them during the molding process. These sand mixtures may be found in natural deposits or may be made up in the foundry by suitably combining the sand grains with the bonding materials. During the molding operation, that part of the sand mixture which is subjected to the casting temperature loses the properties which makes it available as a binder and is then said to be "burned out". Changes also take place in the sand mixture used for the cores during the baking of the cores. Most of this bonding material adheres firmly to the sand grains. Further, in the use of the sand mixture, especially those used in steel foundries, there is an accumulation of metallic oxides from the metal poured in the molds, these oxides acting as fluxes to reduce the refractoriness of the sand mixture. The accumulation of the altered bonding substance and the oxides so changes the character of the sand mixtures as to prevent their continued use, the mixtures becoming essentially different mixtures from what they were before use, and it is the ordinary foundry practice to add a sufficient quantity of new sand mixture to the old mixture to prevent accumulation of either altered bonding material or metallic oxides, or both, in sufficient quantities to be detrimental to the manufacture of good castings. This constant addition to the mixture of the new sand material is expensive, several hundreds of thousands of tons of the used sand mixture being wasted annually as a result of these conditions.

Further, with some grades of molding sand in its natural deposit, the bonding substance is of an inferior character and the sand also contains other objectionable substances.

An object of this invention is to so treat either used molding sand mixtures or new sand mixtures of an inferior character, that such sand mixtures may be put into condition to be usable in an efficient way for molding purposes.

A further object of this invention is to so treat used sand mixtures now being wasted as refuse as to eliminate therefrom the altered bonding material, metallic oxides and other foreign matter so that the sand proper may be again combined with a suitable bonding material and restored to its approximate original nature to thereby permit its use as an efficient sand mixture for molding purposes.

A further and more specific object in this connection is to so treat used sand mixtures that the material which adheres to the sand grains may be removed therefrom, and this material, together with the metallic oxides, or other foreign substances, may be reduced or finely subdivided, to thereby place the mixture in a condition whereby the reduced coatings or encrustations of bonding material, and the oxides and other foreign substances may be separated from the sand grains in an efficient manner.

A further object of the invention is to so treat new sand in its natural deposit as to eliminate inferior binding substances or other undesirable substances to permit the sand to be thereafter mixed with a bonding material of an efficient character.

In the reconditioning of used sand mixtures, we have discovered that by subjecting the used sand to a rubbing or abrasive action of a character which will loosen and remove the adhering bonding substances from the sand grains, and which also acts to reduce or finely subdivide such substances and also reduce and subdivide the metallic oxides or other foreign substances found in the used sand, the sand mixture is placed in such condition that it is possible to separate in a satisfactory manner the objectionable bonding material, oxides, and foreign substances from the sand grains by a subsequent mechanical separation, one method of such separation being hereinafter more fully explained.

In the drawing, which is a view partly in side elevation and partly in longitudinal section, there is shown one embodiment of an apparatus which we have found suitable for carrying out our method.

In our treatment of used sand, the sand is preferably first freed from metallic objects, wood, and so forth, by magnetic pulleys, screens, or other suitable devices forming no part of our invention, and then placed in a suitable hopper indicated at 1. From the hopper the sand feeds to a milling machine where it is subjected to a milling action whereby the coatings or encrustations of bonding material are loosened and freed from the sand grains and reduced to a finely subdivided state, and whereby the metallic oxides and other foreign materials more friable than the sand grains are likewise reduced to a finely subdivided state. The mill shown is one of the muller type and is described more fully in Letters Patent of the United States No. 1,508,031 issued to Herbert S. Simpson on September 9th, 1924, only so much of the machine being shown in the drawings as is thought necessary to explain our method. In this machine there is employed a hopper or pan 2 and located in the pan is a pair of mullers 3 which cooperate with the bottom of the pan to so act upon the sand mixture as to effectively remove and reduce the encrustations upon the sand grains and also reduce the metallic oxides and other foreign substances. The action of these mullers in their cooperation with the bottom of the pan is in the nature of a rubbing, scouring or abrasive action upon the sand between the mullers and the pan bottom, the mill being provided with a series of plows (not shown in the present case) which maintain a certain amount of the sand between the mullers and the pan bottom so that the grains of sand are not only rubbed in contact with the muller wheels and the pan bottom, but also rubbed one against another. It has been found that it is desirable to operate upon the sand in this machine from five to fifteen minutes, depending upon the condition of the sand and other details which enter into the operation, and it has also been found that for our purpose the best results are secured by so adjusting the mullers that a space of about one-quarter of an inch exists between the periphery of the muller wheels and the pan bottom. By so operating this machine, the coatings or encrustations of burnt binder are effectively loosened and freed from the sand grains and reduced to a finely subdivided state, and also the metallic oxides or other foreign substances in the sand mixture are likewise reduced to a subdivided condition, the shape of the encrustations and oxides being thereby so changed as to insure a good separation when subjected to the separating operation. While such a machine has been found satisfactory for our purpose, yet our invention contemplates the use of any other form of machine which may be found satisfactory for imparting to the sand a rubbing, scouring or abrasive action to remove the encrustations from the sand grains and for reducing the encrustations and the metallic oxides and foreign substances found in the sand mixture.

In the present embodiment of our invention we have illustrated a separator of the pneumatic type but it is to be understood that our invention contemplates a separating apparatus of any other form which may be found efficient for the purpose, such as the use of screens. The sand mixture after it has been acted upon by the mill just described is deposited in a hopper 16, at the lower open end of which is an endless conveyer 17 which discharges into another smaller hopper 18, the lower end of which leads into the conduit 4. Located in the conduit 4 beneath the opening in the lower end of the hopper 18 is a series of shelves 19 upon which the sand is deposited. One end of this conduit 4 communicates with the upper portion of the hopper 16 through the medium of the conduit 11; a screen 12 being preferably placed across the mouth of the conduit 11 and a deflecting shield shown in dotted lines at 13 being also preferably located just above the mouth of the conduit 11. The other end of the conduit 4, leads to a separating chamber 5 where the separation of the reduced bonding material, oxides and so forth from the sand grains takes place. Just above the upper end of the conduit 4 there is placed a wedge-shaped spreader 7 which is carried by a small box 6 which surrounds the upper end of the conduit and has an open bottom. Leading from the upper end of the separating chamber 5 is a conduit 15 to which is connected a suction fan 20. This suction fan causes a strong current of air to be drawn through conduits 4 and 11 from the upper portion of the hopper 16, which sweeping over the shelves 19 carries the sand mixture rapidly through the conduit 4 and discharges it against the spreader 7 which scatters and diffuses the mixture into thin sheets and projects it downwardly through the open end of the box 6. As the air leaves the conduit 4 and expands, its carrying force is thereby decreased sufficiently to permit the sand grains to drop by gravity to the bottom of the chamber 5 but still possessing sufficient velocity to carry with it the finely subdivided particles of bonding material and oxides through the conduit 15 to a suitable point of discharge.

In the discharge spout 5' at the lower end of the chamber 5, there is a further separation, the spout being provided with a damper 14 which can be turned readily into different positions and also being provided with a series of air openings, one of which is indicated at 5", so that there will be a suction of air at that point which will act on any of the undesirable material which has fallen with the sand grains.

By the method and apparatus described, we are enabled to so treat the used molding sand in which physical and chemical changes have taken place as to restore the sand grains to their original character and thereby provide for the re-use of such sand grains for the making of molding sand which will have all of those properties which the sand originally possessed. Further, in our method and apparatus, we are enabled to so treat a natural deposit of new sand as to permit the ready separation of the sand grains and the natural bond of the same so that bonding material which is of a poor quality can be eliminated from the deposit and another bonding material of suitable character substituted so as to provide a molding sand possessing the necessary high-grade characteristics.

While we have described a process more particularly for the treatment of molding sand, as well as the apparatus for carrying out that process, it is to be understood that the invention is not necessarily limited to the treatment of molding sand, but may be found applicable to the treatment of sand and sand mixtures used in other arts.

Having thus described our invention, we claim:

1. The method of treating a used sand mixture to restore the sand grains to their approximate original character consisting in subjecting the mixture to the action of opposed surfaces, one at least of which is movable, to impart to the mixture a rubbing or scouring action to separate adhering encrusted material from the individual sand grains without crushing the grains and reduce the same, and thereafter separating the sand grains from the freed and reduced material.

2. The method of treating a used molding sand mixture to free the sand grains from adhering bonding material and metallic oxides consisting in subjecting the mixture to the action of opposed surfaces, one at least of which is movable, to impart to the mixture a rubbing or scouring action to free the adhering encrusted material from the individual sand grains and to reduce such material together with the metallic oxides without crushing the sand grains and thereafter subjecting the mass to a separating operation to separate the sand grains from the reduced freed material and oxides.

3. The method of treating a used sand mixture to restore the sand grains to their approximate original character consisting in subjecting the mixture to the action of opposed surfaces, one at least of which is movable, to impart to the mixture a rubbing or scouring action to separate adhering encrusted material from the individual sand grains and reduce the same, and thereafter separating the sand grains from the freed and reduced material by subjecting the entire mass of material to the action of an air current and an impact surface, and reducing the velocity of the air current at the point of impact.

4. In an apparatus of the character described, a chamber, an impact member within said chamber, means for carrying a sand mixture by a forced current of air into said chamber and against said impact surface, the velocity of the air being thereby reduced to permit the less buoyant sand grains to fall by gravity to a point of discharge, and means for creating a reverse current of air through the discharging sand grains, said chamber having a discharge opening for all of the air and the more buoyant remaining particles of the mixture.

5. In an apparatus of the character described, an impact member, means for projecting a mixture of sand and more buoyant material by a forced current of air against said impact member to permit said sand grains to fall by gravity to a point of discharge and means for creating a reverse current of air through the discharging sand grains to wash said sand grains of any more buoyant particles of material carried therewith.

In testimony whereof, we have hereunto set our hands this 5th day of February, 1927.

EDWARD W. CAMPION.
ARTHUR H. DIERKER.